April 3, 1928.
O. Q. BECKWORTH
THERMOSTATIC CURRENT CONTROL
Filed July 9, 1925
1,665,014
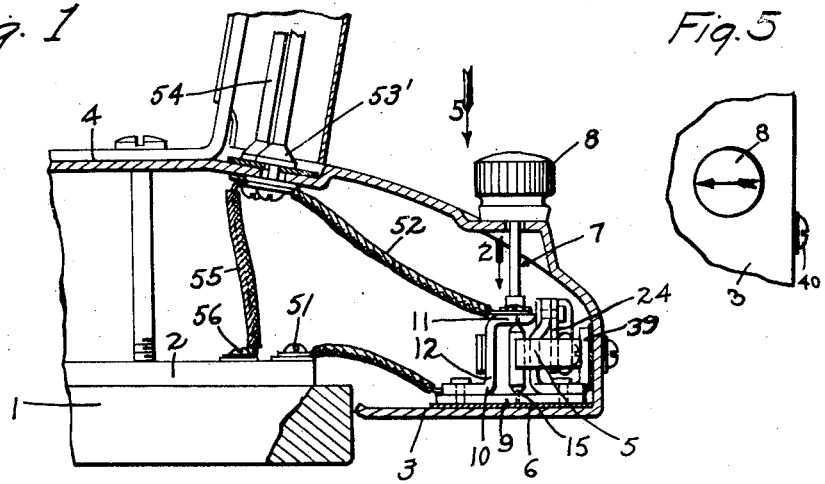
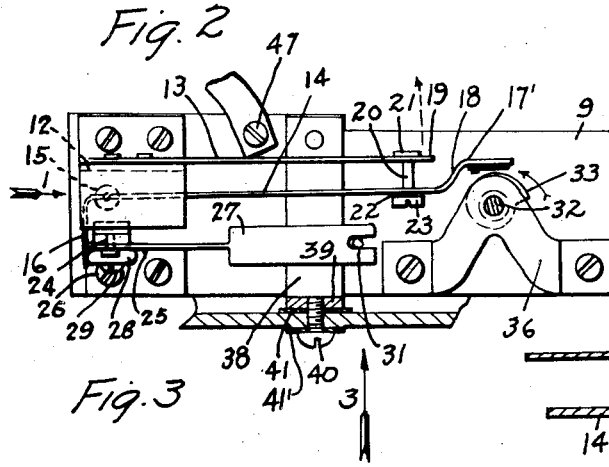
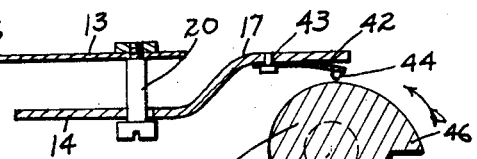
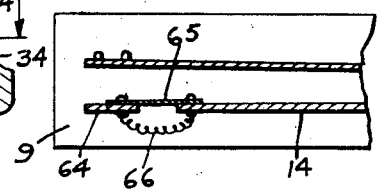
Inventor
Otto Q. Beckworth.
by: Hazard and Miller
Attys.

Patented Apr. 3, 1928.

1,665,014

UNITED STATES PATENT OFFICE.

OTTO Q. BECKWORTH, OF LOS ANGELES, CALIFORNIA.

THERMOSTATIC CURRENT CONTROL.

Application filed July 9, 1925. Serial No. 42,480.

My invention is a thermostatic current control comprising a device thermostatically operated to break an electric current and the method of controlling the make and break of the current.

My invention is particularly adapted to a make and break device actuated by a strip of thermostatic metal in which a conducting bar is deflectably mounted to contact with a regulating post; and the conducting bar is controlled by gravity or spring action to return to its normal position in contact with the regulating post unless held away therefrom by the bending of the thermostatic strip. I also provide the regulating post with a cam-shaped contacting element whereby the amount of heat supplied may be regulated by turning the post and therefore the cam to positions requiring less or a greater amount of heat to bend the thermostatic strip sufficiently to thus break the current.

Another feature of my invention comprises a loose connection between the conducting bar and the thermostatic strip so that if the bar is left in contact with the widest part of the cam and the current is disconnected the thermostatic strip may return to its natural cold position without being subject to a bending action. I prefer a loose connection between the conducting bar and the thermostatic strip of such a character that the strip will conduct very little current if any, and be heated substantially solely by radiation and conducted heat.

My invention comprehends a method and appliance for conducting current with a thermostatic control, substantially without sparking. I provide a strip of thermostatic metal on the end of the conducting bar with a contact point thereon to engage the cam of the regulating post and utilize a small thermostatic strip which on being heated will bend towards the cam. Thus, when the main thermostatic strip draws the conducting bar away from the cam and the temperature is such that it would cause a continuous very rapid slight make and break of the circuit with resulting sparks, the small thermostatic strip with the contact point bends towards the cam and maintains a contact therewith. I thus have the contact point on a small quick acting thermostatic strip so positioned relative to a conducting post and conducting bar that the tendency to formation of sparks is overcome by the strip bending towards the post and maintaining contact until the conducting bar is absolutely removed a sufficient distance from the post to prevent sparks.

My invention also comprehends a visible indicator by securing an indicating knob on the end of the regulating post with indicating marks on a suitable face plate showing relative positions of the cam and therefore relative temperatures generated by the electric current.

My invention will be more readily understood from the following description and drawings, in which;

Figure 1 is a longitudinal section of part of an electric iron showing my thermostatic control device in end view as if in the direction of the arrow 1 of Fig. 2.

Fig. 2 is a plan of the thermostatic control device on the line 2—2 in the direction of the arrow of Fig. 1.

Fig. 3 is a side elevation with the regulating post partly in section in the direction of the arrow 3 of Fig. 2.

Fig. 4 is an enlarged horizontal section on the line 4—4 of Fig. 3 showing the action of the thermostatic strip to break the current and the thermostatic contact strip to prevent sparking.

Fig. 5 is a partial plan of the casing and indicating knob in the direction of the arrow 5 of Fig. 1.

Fig. 6 is a partial plan of another type of mounting for the conducting bar and the thermostatic strip utilizing a leaf spring to press the conducting bar.

Fig. 7 is a further alternative form in which the conducting bar is supported by a light deflectable plate.

Referring particularly to Fig. 1, an electrically heated device is indicated by an electric iron 1, having a heating element 2, which may be of any usual type. The casing 3 is formed integral with or attached to the main housing 4 of the iron. The thermostatic control device indicated generally by the numeral 5 is supported in the casing 3, being insulated therefrom by insulating strips or sheets 6. A regulating post designated generally by the numeral 7 of the thermostatic device with a knob 8 at its upper end is a means by which the heat may be regulated as hereafter described.

The thermostatic device is illustrated more fully in Figs. 2 and 3 in which a base plate 9 forms the mounting for the device. A bracket 10 is secured to the base and has a horizontal flange 11 and a vertical web 12. A strip of thermostatic metal 13 is rigidly secured to the web and a conducting bar 14 is attached to the pivot pin 15 which is mounted between the horizontal flange and the base. The conducting bar has a right angular off-set end 16 back of the pivot and the contact end 17 is suitably shaped and is shown bent at the section 18 to clear the end 19 of the thermostatic strip. A draw pin 20 is rigidly secured to the thermostatic strip by means of the nut 21 engaging a screw threaded end and passes freely through an aperture 22 in the conducting bar and has an enlarged head 23 to engage said bar to draw it away from its contact. Viewed in the direction of Fig. 2, the thermostatic strip bends in the direction indicated by the arrow when it becomes heated.

The gravity control device for the conducting bar comprises a second bracket 24 secured to the base and having a bell crank 25 pivotally mounted in the pivot pin 26. This crank has a heavy weight 27 on the horizontal part of the bar and preferably a roller 28 attached to a pin 29 on the vertically depending end of the bell crank. This roller always maintains contact with the off-set end 16 of the conducting bar 14 and tends to hold the bar into close contact with its opposing electrical terminal unless positively drawn away by the thermostatic strip 13. A guide pin 30 engages in a notch 31 in the weight and prevents the weight from becoming displaced.

The regulating post 7 has a round rod 32 and has a conducting cam 33 formed thereon and in electrical contact therewith. Insulating sleeves 34 insulate the post from the base and an upper insulating sleeve 35 insulates the post from a U-shaped supporting brace 36, which is secured to the base and has an aperture 37 for reception of the sleeve 35.

A holding strip of metal 38 having an upstanding end 39 is provided for securing the thermostatic control device to the casing 3 of the electric iron by a screw 40. An insulating strip 41 is inserted between the end 39 and the casing 3 and an insulating strip 41' between the screw 40 and the casing (see Fig. 2).

The spark preventing connection is shown particularly in Fig. 4. The contact end 17 of the conducting bar 14 has a short fine strip of thermostatic metal 42 secured thereto by a screw or the like 43 and having a contact button 44 on the end of the strip, the button making contact with the conducting cam 33. This cam is formed in the shape of a scroll having a narrow side 45 and a wide side 46 giving different positions from the rod 32 on which the cam is mounted.

The thermostatic control device is connected in series with the elements to be heated and is provided with a fixed terminal 47 shown secured to the base and with a terminal 48 having a tight brush fit on the rod 32. This terminal is insulated from the brace 36 by an insulating washer 49.

The circuits are indicated in Fig. 1. A lead 50 is carried from the fixed terminal 47 to a binding post 51 on the element. A second lead 52 is carried from the brush terminal 48 to one of the plug posts 53. The second plug post 54 is connected by a wire 55 to the second binding post 56 on the electric element. The current may be established by connecting a suitable conducting socket to the posts 53 and 54 or by use of a suitable switch in a circuit connected to the said plugs.

The action of my thermostatic current control device is substantially as follows:

As above described the weight 27 through the action of the bell crank 25 and the pressure of the roller 28 on the off-set end 16 of the conducting bar 14 always tends to hold the contact button 44 in engagement with the conducting cam 33. When the knob 8 is turned to indicate the low position the button 44 will be in engagement with the narrow portion of the cam 45. As the thermostatic strip 13 becomes heated it bends outwardly in the direction of the arrow shown in Fig. 2 and swivels the conducting bar 14 through the medium of the loose fitting pin 20 with the enlarged head 23 engaging the bar.

If more heat is required than would be given by such position of the cam, the button is turned so that the cam is rotated in an anti-clockwise direction as indicated by the arrows in Figs. 2 and 4. This action causes the electric contact to be maintained while the thermostatic metal is retained with a considerable bend. When the highest temperature is required the button 8 is further turned until the contact button 44 engages the widest part of the cam 46, so that the thermostatic metal will have its greatest bend before drawing the contact bar 14 away from the conducting cam 33. It will be obvious that if a substantially fixed temperature is required the button 8 forming the indicating knob is left at the desired position and if the temperature rises the thermostatic metal breaks the circuit and when it falls the conducting bar 14 may return to again establish the circuit.

It is to be noted that the conducting bar 14 is actuated by gravity when the base plate 9 is horizontal as shown in Fig. 3 through the action of the weight 27 and also when the base plate 9 is in a vertical position as shown in Fig. 2, due to the weight of the conducting bar itself. Should it happen that the operator switch off the current with the cam 33 positioned to engage the button 44 on the wide part of the cam, the thermostatic strip 13 may cool off and return to its normal position shown in Fig. 2 without bending the thermostatic strip as the draw pin 20 is free to pass through the aperture 22 in the conducting bar. Thus there is no danger of giving a permanent incorrect set to the thermostatic strip 18.

The operation of the spark preventing contact as shown in Fig. 4, is substantially as follows:

It is presumed that the knob 8 and thus the cam 33 are in a certain adjusted position for the temperature desired, but this temperature does not remain absolutely constant so far as its effect on the thermostatic strip 13 is concerned, as this strip heats slightly it draws the contact button 44 away from the cam 33 and tends to form a spark if not forming an actual spark. This gives a rapid increase in temperature causing a rapid but slight movement of the conducting bar 14.

When the minute sparks are formed or the rapid increase in temperature is momentarily created, the secondary and small thermostatic strip 42 bends towards the cam 33 as indicated in Fig. 4 and the higher the temperature the more it bends. Therefore the action of this second strip is to maintain a tight contact between the button 44 and the surface of the cam 33 and hence prevent sparking or chattering of the contact.

Fig. 6 is a further modification in which the conducting bar 14 is pivoted outside of the thermostatic strip 13 and in which an adjustable pin 60 which is preferably screw threaded, is held in position on the thermostatic strip by a pair of locking nuts 61. In this construction, when the thermostatic strip flexes in the direction of the arrow it pushes the conducting bar 14 instead of drawing the bar as shown in Fig. 2.

This figure also illustrates the use of a leaf spring 62 secured to the bracket 63 with its end bearing against the off-set end 16 of the conducting bar.

Figure 7 is a construction somewhat similar to Fig. 2 in which the conducting strip 14 is connected to a fixed bracket 64 by means of a resilient leaf spring 65. I also show an electric wire 66 in the form of a "pig tail" connected to the end of the bar and the bracket 64.

In both Figures 6 and 7, I utilize as springs, ordinary spring metal suitably heat treated.

From the above description it will be clear that when my thermostatic control is used in an electric iron or similar structure that the thermostatic strip when it becomes cold may always return to its normal position and therefore will not obtain a permanent seat which would destroy the accuracy of the temperature at which the circuit would be broken. It is immaterial so far as the return of the thermostatic strip is concerned, as to whether or not the conducting bar is pressed outwardly by the cam or has been released. As above mentioned, the reason for using a cam is so that the conducting bar may be slightly shifted so that the thermostatic strip must bend to a greater extent before the current is broken; therefore heating the iron to a higher temperature.

When the iron is in a horizontal position it is manifest that the weight 27 will return the conducting bar into its normal position or positioned close to the cam when the thermostatic strip has drawn it away in breaking the current, or the cam has been turned back from a high heating temperature to a low heating or cut off position. It is apparent that the cam may be so shaped that the current may be cut off by the relative position of the cam and the conducting strip. As it is quite a common practice to turn an iron in its end when not in immediate use, therefore it is apparent that the conducting bar would return to its normal position due to its own weight by the action of gravity. Therefore when the iron is in its horizontal position or up on its base end the conducting bar is controlled by the weight.

It will be apparent that my construction of thermostatic control device may be considerably modified to be adapted to different uses and to connect to other devices it is desired to heat. It is also apparent that the principle of utilizing gravity to return a contacting element into its contacting position after actuation by a thermostatic device could be utilized in many ways. The spark prevented by a contact having thermostatic metal could also be utilized in other constructions than those illustrated herein.

Having described my invention, what I claim is:

1. A thermostatic current control device comprising in combination a deflectable conducting bar having a conducting end, a contact suitably positioned to engage therewith, a thermostatic strip, a loose draw pin connecting the bar and strip to allow movement of the strip independent of the bar to a desired extent, the movement of the strip on increase of temperature through the medium of the pin moving the bar to break the contacts, and actuating means independent of the operation of the thermostatic strip and independent of the physical characteristics of the conducting bar to return the conducting bar into contacting position on cooling of the thermostatic strip.

2. A thermostatic current control device as claimed in claim 1, having said actuating means including a gravity actuated means operable when the contact bar is positioned in the vertical and horizontal positions.

3. A thermostatic current control device as claimed in claim 1, having said actuating means including a swivelling weight operatively connected to the conducting bar to move it when in one position, the weight of the bar itself forming a means to move the bar when in another position.

4. A thermostatic control device, comprising in combination a base, a conducting bar swivelly mounted thereon, a thermostatic strip fixedly mounted in relation to the base and loosely connected at one end of the conducting bar, a contact element on the end of the bar, a regulating post having another element to co-act therewith and a weight pivotally supported from the base and operatively connected with the contact bar tending to force said bar into contacting positions.

5. A thermostatic control device as claimed in claim 4, in which the swivelling connection of the conducting bar is positioned relative to the operative connection of the weight, whereby the weight returns the bar to contacting position when said bar is in a vertical position and the weight of the bar returns it into contacting position when the bar is in a horizontal position.

6. A thermostatic control device as claimed in claim 4, in which the thermostatic strip is connected to the conducting bar by a draw pin fixed to the thermostatic strip passing through an aperture in the conducting bar and having an enlarged head to engage said bar.

7. A thermostatic control device comprising in combination a base, a conducting bar swivelly mounted thereon, a main thermostatic strip fixedly mounted in relation to the base and loosely connected to one end of the conducting bar, a second thermostatic strip on the end of the conducting bar, adapted to bend in an opposite direction to that of the main thermostatic strip, a regulating post having a contact element adapted to engage the second thermostatic strip, the said strip bending towards the regulating post on increases of temperature, and thereby reducing sparking, and a weight pivotally supported from the base and operatively connected with the contact bar, tending to force said bar into contacting positions.

8. In an electric heating device, a thermostatic temperature control comprising in combination a conducting cam, a regulating post to actuate said cam, a conducting bar having means tending to normally bring said bar into engagement with the cam, a secondary thermostatic strip on the conducting bar, adapted on increase of temperature to bend towards the cam and thereby reduce sparking, a primary thermostatic strip fixedly secured at one end and loosely connected to the conducting bar, said strip being adapted to break the contact between the bar and the cam on increase of temperature, the connection of the main thermostatic strip to the bar permitting said strip to return to normal cold position whether or no the conducting bar is released from the cam or not.

9. A thermostatic control device comprising in combination a base, a bracket secured thereto, a conducting bar swivelled on a vertical axis between the bracket and the base, a contact button connected to one end of the bar, a thermostatic strip fixed to the bracket spaced from the conducting bar and loosely connected therewith at its outer end, a regulating post having a conducting cam supported in a bracket to engage the contact button and a gravity actuated device operatively connected to the conducting bar tending to draw the contacting button into engagement with the conducting cam.

10. A thermostatic control device as claimed in claim 9 the gravity actuated device having a bell crank lever mounted on the bracket secured to the base, a weight on the horizontal arm of the lever and means on the vertical arm of the lever to engage a lateral extension of the conducting bar.

11. A thermostatic current control device comprising in combination a deflectable conducting bar having a contact end, an adjustable contact suitably positioned to engage therewith and to initially deflect the conducting bar, a thermostatic strip fixed at one end and loosely connected to the conducting bar adjacent its other end to break the contacts by further deflection of the bar on increase of temperature, the mounting of the strip and its connection with the bar allowing the strip to return to its normal cold position independent of the return of the bar to its normal cold position.

12. A thermostatic current control as claimed in claim 11, having in addition a weight operatively connected to the conducting bar adapted to return the said bar to its normal cold position on cooling of the thermostatic strip and on the release of the bar from its initial deflection by the adjustable contact.

13. An electric heating device having a base adapted when in use to occupy a horizontal position, a conducting bar mounted to deflect horizontally, an adjustable contact cam mounted on a vertical axis to initially deflect the bar, a thermostatic strip rigidly secured to one end and extending substantially parallel to the bar and having a loose connection with the bar at its other end, adapted to act on the bar at any deflection to break the circuit, the said connection allowing the strip to return to normal cold position whether or no the bar returns to its normal cold position, a weight pivotally mounted on a horizontal pivot, and an operative connection between the weight and the bar tending to move same towards the adjustable contact.

14. An electric heating device as claimed in claim 13, in which the mounting of the bar relative to the cam contact permits the bar to move towards same when the heating device is standing on one end independent of the action of the weight.

15. A thermostatic current control device comprising in combination a deflectable conducting bar having a contact end, a contact suitably positioned to engage therewith, a thermostatic strip operatively connected to the bar and moving independently thereof to break the contacts on increase of temperature, the said contacts being disconnected from the strip, and actuating means independent of the movement of the thermostatic strip and independent of the physical characteristics of the conducting bar to return the conducting bar into contacting position on cooling of the thermostatic strip.

16. A thermostatic current control device as claimed in claim 1, in which a gravity actuating means is positioned and constructed to be operable to return the conducting bar, whether the same is positioned to deflect in a vertical or a horizontal plane.

17. A thermostatic current control device as claimed in claim 1, in which the thermostatic strip is fixedly supported and the operative connection to the conducting bar and the situation relative thereto allows the thermostatic strip to return to its normal cold pisition independent of the conducting bar and the conducting bar to return to make an electric contact by its own weight.

18. A thermostatic control device, comprising in combination a base, a conducting bar swingingly mounted thereon, a thermostatic metal strip of known co-efficient of deflectability, fixedly mounted in relation to the base and so positioned relative to the conducting bar that when deflected by heat, such deflection will move the conducting bar relatively therewith, a contact element on the end of the bar, a second contact element movably mounted to co-act therewith and means operatively connected with the conducting bar tending to force said contact elements together.

19. In combination, a current conducting element, a thermostatic strip, a pin loosely connecting the strip to said conducting element, a cam forming a contact with the conducting element, to deflect said element, wherby different temperatures are required to break the circuit, the connection between the thermostatic strip and the conducting element allowing said strip to return to its normal cold position, whether or no the conducting element is deflected by the cam, and a visible means to indicate the approximate heat the electric heater will attain before the circuit is broken.

20. In combination as claimed in claim 19, having in addition means independent of the thermostatic strip and independent of the physical characteristics of the conducting bar to return the conducting element to its undeflected position after release by the cam and when the thermostatic strip is cooled.

In testimony whereof I have signed my name to this specification.

OTTO Q. BECKWORTH.